(12) United States Patent
Rho

(10) Patent No.: US 6,174,002 B1
(45) Date of Patent: Jan. 16, 2001

(54) TUBE COUPLING AND METHOD OF PRODUCING SEPARATION PREVENTION RING FOR THE TUBE COUPLING

(75) Inventor: Kuen-Yeong Rho, Ansan (KR)

(73) Assignees: Kuroda Precision Industries Ltd. (JP); Shinyeong Mechatronics Co., Ltd. (KR)

(*) Notice: Under 35 U.S.C. 154(b), the term of this patent shall be extended for 0 days.

(21) Appl. No.: 09/334,285

(22) Filed: Jun. 16, 1999

(30) Foreign Application Priority Data

Jul. 10, 1998 (KR) .................................................. 98-27887

(51) Int. Cl.[7] ........................................................ F16L 17/00
(52) U.S. Cl. ........................... 285/340; 285/39; 285/308
(58) Field of Search ................................... 285/340, 308, 285/39

(56) References Cited

U.S. PATENT DOCUMENTS

| | | | |
|---|---|---|---|
| 3,837,687 | * 9/1974 | Leonard | 285/111 |
| 4,084,843 | * 4/1978 | Gassert | 285/340 X |
| 4,586,734 | * 5/1986 | Grenier | 285/340 |
| 4,593,943 | * 6/1986 | Hama et al. | 285/308 |
| 4,667,988 | * 5/1987 | Maier et al. | 285/340 |
| 4,747,626 | * 5/1988 | Hama et al. | 285/308 |
| 5,692,784 | * 12/1997 | Hama et al. | 285/308 |
| 5,779,284 | * 7/1998 | Guest | 285/340 X |

FOREIGN PATENT DOCUMENTS 8-326976    7/1998    (KR).

* cited by examiner

*Primary Examiner*—Teri Pham Luu
(74) *Attorney, Agent, or Firm*—Gilster, Peter S. Greensfelder, Hemker & Gale, P.C.

(57) ABSTRACT

A tube coupling according to the present invention comprises a coupling body, a separation prevention ring which is disposed in the coupling body to bite into the outer wall of a tube body fitted into the coupling body so to prevent the tube body from coming out, and a release ring which is disposed in the coupling body so to be movable in an axial direction within a predetermined range and releases the separation prevention ring from the tube body by pushing the separation prevention ring, wherein the separation prevention ring comprises a ring portion which contacts a back ring disposed in the coupling body; pushing portions which are radially formed in a large number within the ring portion, has a circular shape, have grooves which extends from the outside of the ring portion to the inside, and are pushed by an inside end of the release ring; and projections which are respectively formed at the tips of the pushing portions and pulled out of the outer wall of the tube body when they are pushed by the inside end of the release ring in a state fitted in the outer wall of the tube body.

1 Claim, 5 Drawing Sheets

PROCESS OF PHOTOETCHING IN THE FIRST EMBODIMENT

PRIOR ART

TUBE COUPLING AND METHOD OF PRODUCING SEPARATION PREVENTION RING FOR THE TUBE COUPLING

BACKGROUND OF THE INVENTION

1. Field of the Invention

The present invention relates to a tube coupling for connecting tubes.

2. Description of the Related Art

Conventionally known tube couplings are disclosed in the Official Gazette of the Japanese Laid-Open Publication Application No.Hei8-326976, for example. As shown in FIG. 6 and FIG. 7, a conventional tube coupling comprises a coupling body 10, a separation prevention ring 20 which is disposed within the coupling body 10, and a release ring 30 which pushes the separation prevention ring 20 while moving in a predetermined range from the coupling body 10.

The separation prevention ring 20 is intervened between a back ring 13 and a guide ring 14, which are disposed within the coupling body 10 so to be prevented from separating from the coupling body 10. A seal ring 40 is disposed in the coupling body 10 to make sealing secure by tightly adhering to the outside wall of the tube body 1. And, a shoulder portion 11, which an inside end portion of the tube body 1 contacts, is formed in the coupling body 10.

As shown in FIG. 6 and FIG. 7, the separation prevention ring 20 has outer edges 22 that intervene between the back ring 13 and the guide ring 14 and inner edges 21 which bites into the tube body 1 and has a zigzagged annular shape which is of many radial grooves 23 alternately formed by the inner edges 21 and the outer edges 22.

The outer peripheral edges of the separation prevention ring 20, namely the outer edges 22, have a fixed width and substantially the same total length as that of the inner edges 21. When the tube body 1 is inserted into the separation prevention ring 20, the inner edges 21 bite into the outer wall of the tube body 1 to prevent the tube body 1 from falling out of the coupling body 10.

But, in the separation prevention ring 20 shown in FIG. 7, since the total length of the outer edges 22 fixed by the back ring 13 and the guide ring 14 is substantially the same as that of the inner edges 21 which bite into the tube body 1, if the tube body 1 fixed by the inner edges 21 is forcedly pulled, a force applied to the outer edges 22 deforms the original shape of the outer edges 22 and damages the outer edges 22. Accordingly, the separation prevention ring 20 is separated from the back ring 13 and the guide ring 14 and may be separated from the tube coupling 10 as a result.

Since it is configured so that a large number of inner edges 21 bite into the tube body 1 at the same time, when the tube body 1 is slantly pulled from the coupling body 10, a part of the inner edges 21 can no longer properly bite into the outer wall of the tube body 1, causing the tube body 1 to fall out of the coupling body 10.

SUMMARY OF THE INVENTION

The present invention was achieved in order to solve the problems described above. And it is an object of the present invention to provide a tube coupling which can prevent a tube body from pulling out by securely biting into a coupling body in the tube body and can prevent a separation prevention ring, which bites into the tube body, from being separated even if the tube body is pulled by a strong force.

It is also an object of the present invention to provide a method for producing a separation prevention ring for such tube coupling.

In order to achieve the above object, the tube coupling according to the present invention comprises a coupling body, a separation prevention ring which is disposed in the coupling body to bite into the outer wall of a tube body fitted into the coupling body so to prevent the tube body from falling out, and a release ring which is disposed in the coupling body so to be movable in an axial direction within a predetermined range and releases the biting into the tube body by the separation prevention ring by pushing the separation prevention ring, wherein the separation prevention ring comprises a ring portion which contacts a back ring disposed in the coupling body; pushing portions which are radially formed in a large number within the ring portion, and have grooves which have a circular shape and extends from the outside of the ring portion to the inside, and are pushed by the inside end of the release ring; and projections which are respectively formed at tips of the pushing portions and pulled out of the outer wall of the tube body when they are pushed by the inside end of the release ring in a state fitted in the outer wall of the tube body.

The tube coupling according to the present invention has an advantage that the outer edges are held between the back ring and the guide ring and not separated even if the tube body fixed by the inner edges is pulled by a strong force, because the total length of the outer edges positioned between the back ring and the guide ring is formed to be longer than the total length of the inner edges biting into the coupling body.

Since it is configured that a plurality of projections are simultaneously pressed so to bite into the outer wall of the tube body, even if the tube body is slantly pulled from the coupling body, the tube coupling has an advantage that the projections fitting into the outer wall of the tube body makes it hard for the tube body to fall out of the tube coupling.

Meanwhile, since a portion for joining the pushing portion with the ring portion of the separation prevention ring has a small width, there is an advantage that the tube body can be inserted into the tube coupling by a small force, and the tube body is readily pulled out of the tube coupling just by slightly pushing the release ring.

In order to achieve the above-described object, the first method for producing the separation prevention ring is comprised by a step of forming a photosensitive layer by applying a photoresistant to a predetermined metal plate; a step of forming patterns of an annular ring portion and a plurality of circular pushing portions and projections protruded from the tips of the respective pushing portions in a radial pattern within the ring portion by enlightening the photosensitive layer; and a step of etching with an etching solution along the patterns of the metal plate, on which the patterns of the ring portion, the pushing portions, and the projections are formed.

The second method for producing the separation prevention ring is comprised by a step of forming to have the shapes of the inside diameter and the outside diameter of the separation prevention ring by stamping.

DETAILED DESCRIPTION OF THE PREFERRED EMBODIMENT

Embodiments of a tube coupling and method of producing separation prevention ring for the tube coupling according to the present invention will be described in detail with reference to the accompanying drawings.

Figure 1:
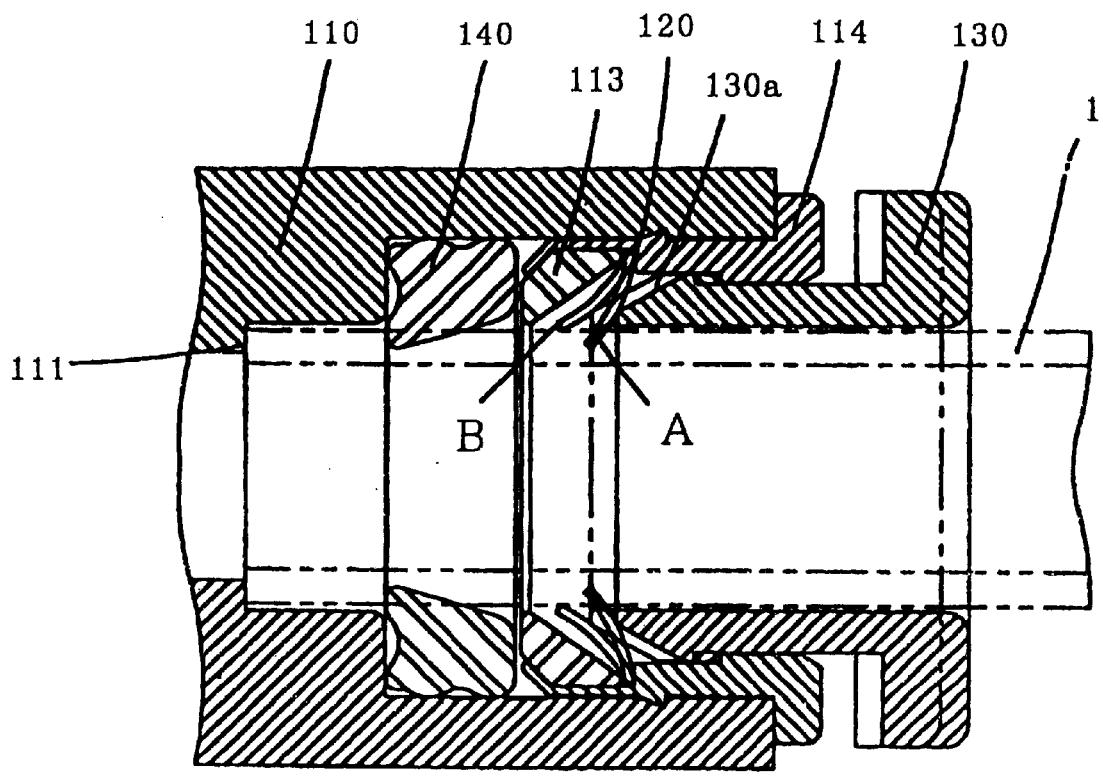
FIG. 1 is a cross-sectional view of a tube coupling according to an embodiment of the present invention.
Figure 2:
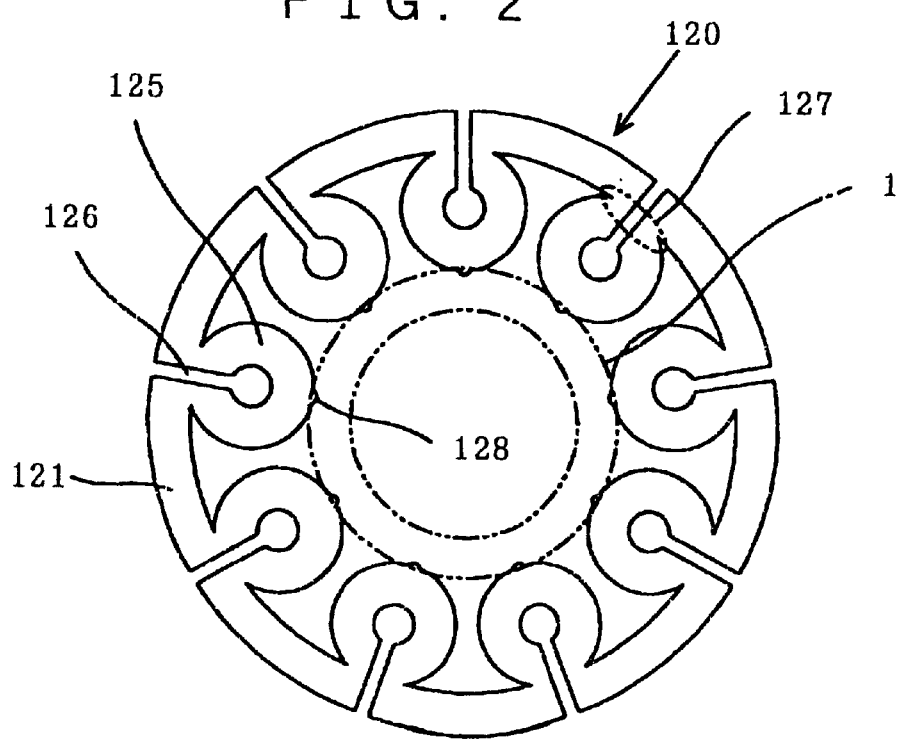
FIG. 2 is a plane view of a separation prevention ring according to the first embodiment which is applied to the tube coupling shown in FIG. 1.

FIG. 1 is a cross-sectional view of a tube coupling according to the first embodiment of the present invention. FIG. 2 is a plane view of a separation prevention ring applied to the tube coupling of FIG. 1.

The tube coupling according to this embodiment comprises a coupling body 110, a separation prevention ring 120 which is disposed within the coupling body 110, and a release ring 130 which pushes the separation prevention ring 120 while moving in a pre-determined range from the coupling body 110.

The separation prevention ring 120 is intervened between a back ring 113 and a guide ring 114 which are disposed within the coupling body 110 so to be prevented from separating from the coupling body 110. A seal ring 140 is disposed in the coupling body 110 to make sealing secure by tightly adhering to the outside wall of a tube body 1. A shoulder portion 111 is formed in the coupling body 110 so to contact to an end portion of the tube body 1.

The separation prevention ring 120 bites into the outside wall of the tube body 1, which is fitted into the coupling body 110, to prevent the tube body 1 from falling out of the coupling body 110. This separation prevention ring 120 comprises a ring portion 121 which intervenes between the back ring 113 and the guide ring 114 disposed in the coupling body 110 and pushing portions 125 which are radially formed in a large number within the ring portion 121.

Each of the pushing portions 125 has an annular shape like a perforated coin for example. Each pushing portion 125 also has a groove 126 which is formed from the outer periphery of the ring portion 121 extending to the center of the pushing portion 125 and has a round end. The width of a joint portion 127 for joining the pushing portion 125 and the ring portion 121 is very small as compared with the diameter of the pushing portion 125. The joint portion 127 is formed to have a width as small as possible and the groove 126 is formed on the pushing portions 125, so that the pushing portions 125 can be pushed by applying only a small force.

And, a pointed projection 128 is formed at the tip of each pushing portion 125.

When the tube body 1 is inserted into the coupling body 110, the projections 128 are pushed against the outer wall of the tube body 1 so to prevent the tube body 1 from being separated from the coupling body 110.

The tube body 1 is designed to pass through the separation prevention ring 120 when it is inserted into the coupling body 110. And, by virtue of the structure of the grooves 126 and the joint portions 127, a sufficient space to allow the passage of the tube body 1 is formed by pushing the pushing portions 125 which are even slightly pushed by the tube body 1. Thus, the tube body 1 can be connected to the tube coupling by applying a small force.

Besides, when the release ring 130, which is later described, is slightly pushed to remove the tube body 1 from the coupling body 110, the pushing portions 125 are pushed, the projections 128 pushed against the outer wall of the tube body 1 are separated, and the tube body 1 is pulled out.

Figure 3:
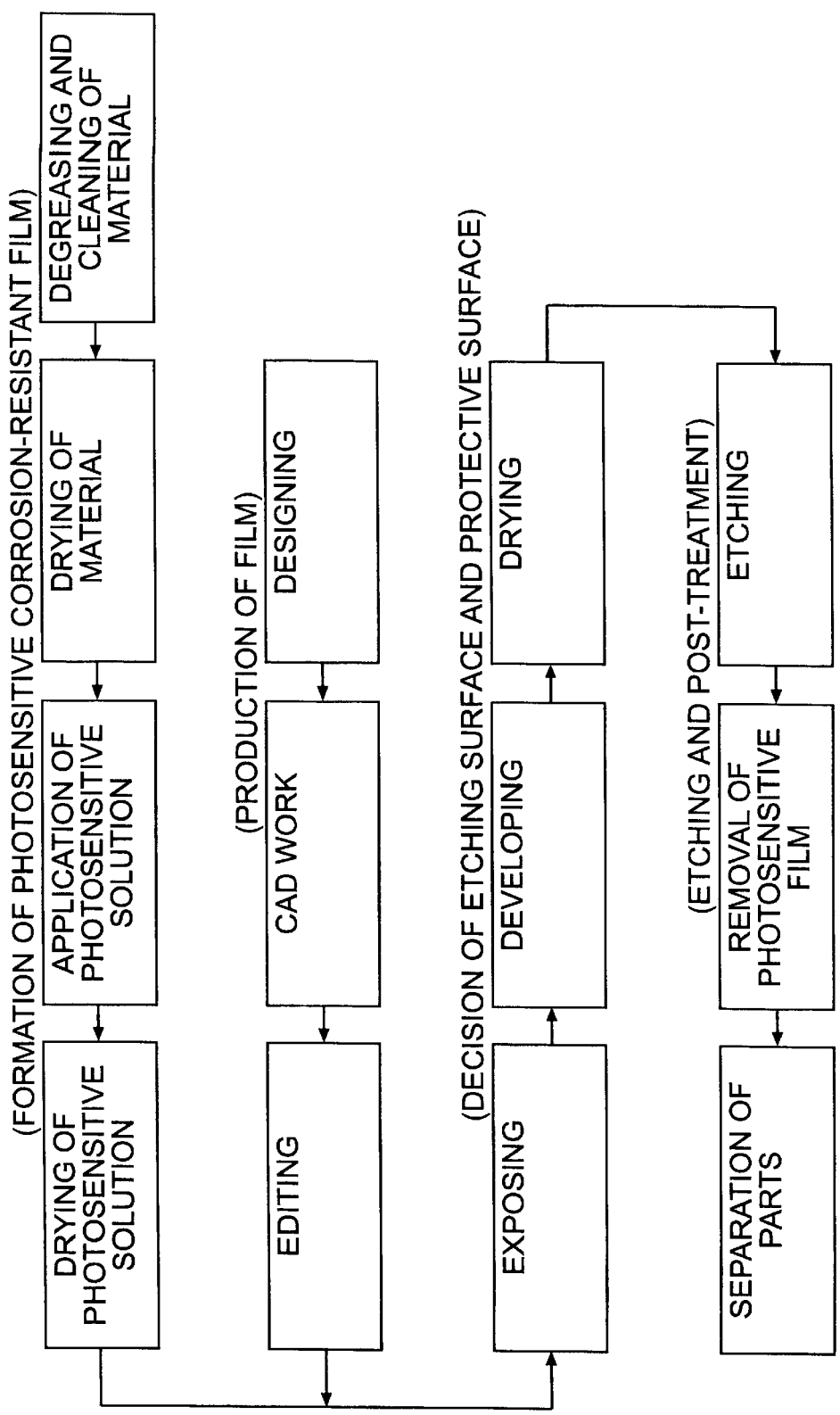
FIG. 3 is a chart explaining a step of photoetching in the first method of producing the separation prevention ring shown in FIG. 2.

Next, a method for producing the release ring 130 by photoetching according to this embodiment will be described. The process is roughly shown in FIG. 3.

First, a photoresistant is applied to a predetermined metal plate (SUS301EH in this embodiment) to form a photosensitive layer.

Secondly, the photosensitive layer is irradiated with light to form patterns of an annular ring portion, and a plurality of circular pushing portions and projections protruded from the tips of the respective pushing portions in a radial pattern within the ring portion.

Finally, the metal plate having the patterns of the ring portion, pushing portions, and projections is etched along the patterns with an etching solution to complete the separation prevention ring 120.

By photoetching, the grooves 126 and the joint portions 127 can be formed to have a much smaller width.

In this embodiment, the joint portion 127 has a total width of 1.44 mm, the groove 126 has a width of 0.2 mm, and the projection 128 formed at the tip of the pushing portion 125 has a width of 0.5 mm. The separation prevention ring 120 has a thickness of 0.2 mm, the ring portion 121 has a width of 0.5 mm, and the space between each neighboring pushing portions 125 is 0.36 mm.

The release ring 130 is disposed to be movable in an axial direction within a predetermined range from the coupling body 110. An inside end 130a of the release ring 130 pushes the pushing portions 125 of the separation prevention ring 120. Specifically, when the projections 128 of the pushing portions 125 are fitted into the outer wall of the tube body 1, pushing of the release ring 130 causes the inside end 130a to push the pushing portions 125. Thus, the projections 128 are separated from the outer wall of the tube body 1, and the tube body 1 can be separated from the tube coupling.

In this embodiment, the metal plate could be an SK steel plate, a stainless steel plate, a phosphor bronze plate, a brass plate, a beryllium copper plate or an albata plate for springs.

Now, operation of the tube coupling configured as above will be described.

Before the tube body 1 is inserted into the coupling body 110, the projections 128 and parts of the tips of the pushing portions 125 are positioned at position A just inside of the outer surface of the tube body 1. When the tube body 1 is pushed in, the outer peripheral surface of the tube body 1 can push the pushing portions 125 to pass through the separation prevention ring 120. The tube body 1 is inserted to come in contact with the shoulder portion 111, and the pushing portions 125 have the tendency to try to return to their original positions while being pushed by the tube body 1. In this state, when the tube body 1 is slightly pulled, the projections 128 fitted in the outer peripheral surface of the tube body 1, and the tube body 1 is securely fixed to the coupling body 110. Even if the tube body 1 is slantly pulled, the tube body 1 is kept in a securely fixed state because the projections 128 are fitted into the tube body 1.

When the tube body 1 is to be pulled out, the release ring 130 is slightly pushed. Then, the inside end 130a of the release ring 130 is moved to position B while pushing the pushing portions 125, so that in the process the projections 128 are separated from the outer wall of the tube body 1. In this state, the tube body 1 can be separated easily from the coupling body 110 by pulling it.

The total length of the respective pushing portions 125 which bite into the outer wall of the tube body 1 is shorter than the total length of the ring portion 121 which intervenes between the back ring 113 and the guide ring 114. Therefore, even when the tube body 1 is pulled with excessive force applied to the pushing portions 125, the ring portion 121 is not deformed or pulled out of the coupling body 110.

Besides, the projections 128 can be prevented from being pulled out of the outer wall of the tube body 1 even when the tube body 1 is slantly pulled from the coupling body 110 because the projections 128 are fitted into the tube body 1.

Figure 4:
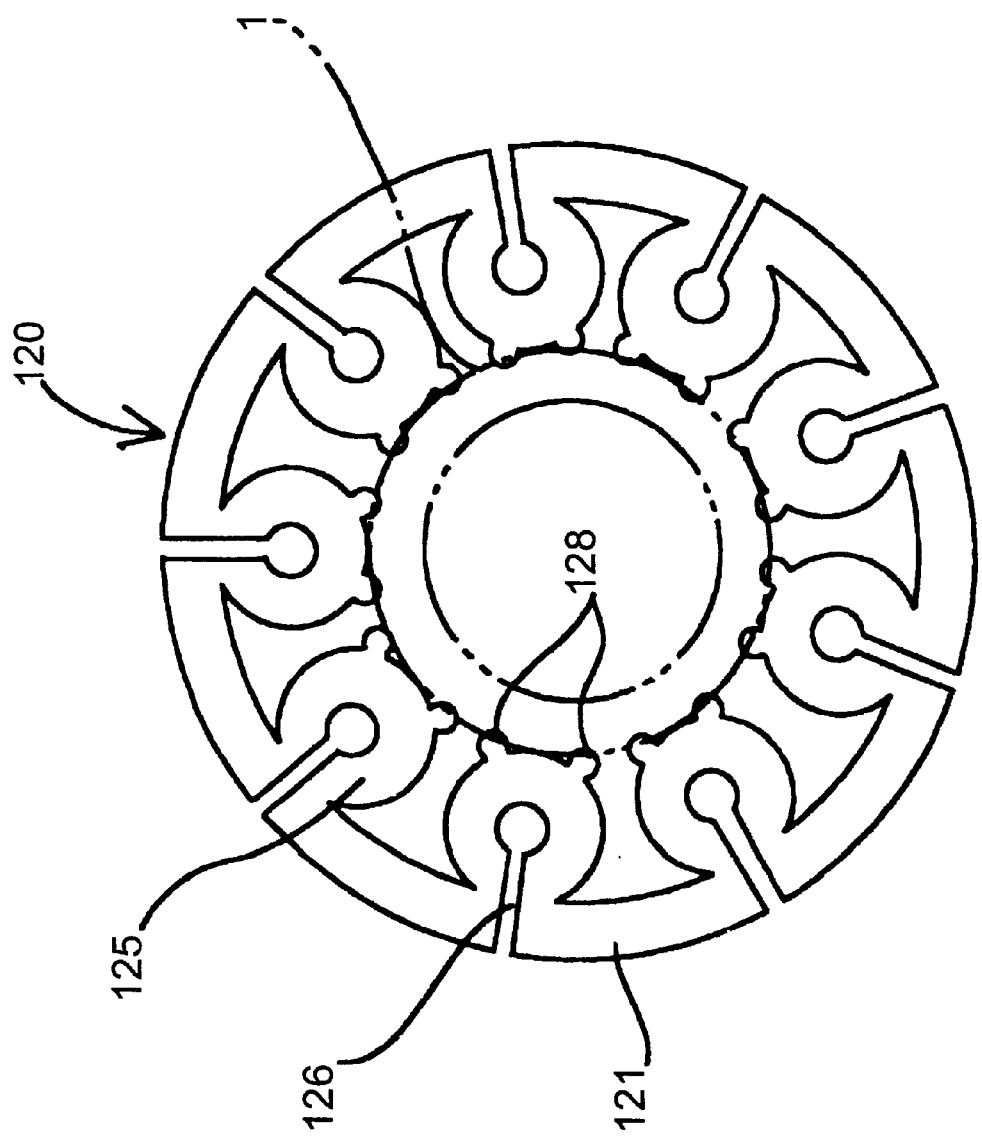
FIG. 4 is a plane view showing a modified example of the separation prevention ring applied to the tube coupling shown in FIG. 1.

In the first embodiment, the separation prevention ring 120 has a single projection 128 formed on each pushing portion 125 on the inner peripheral side of the separation prevention ring 120. But, in this present invention, for example, two projections 128 can also be formed on each pushing portion 125 as shown in FIG. 4. Thus, the tube body 1 can be held more securely, and it has the effect that the tube body 1 can reliably be prevented from being separated.

Figure 5:
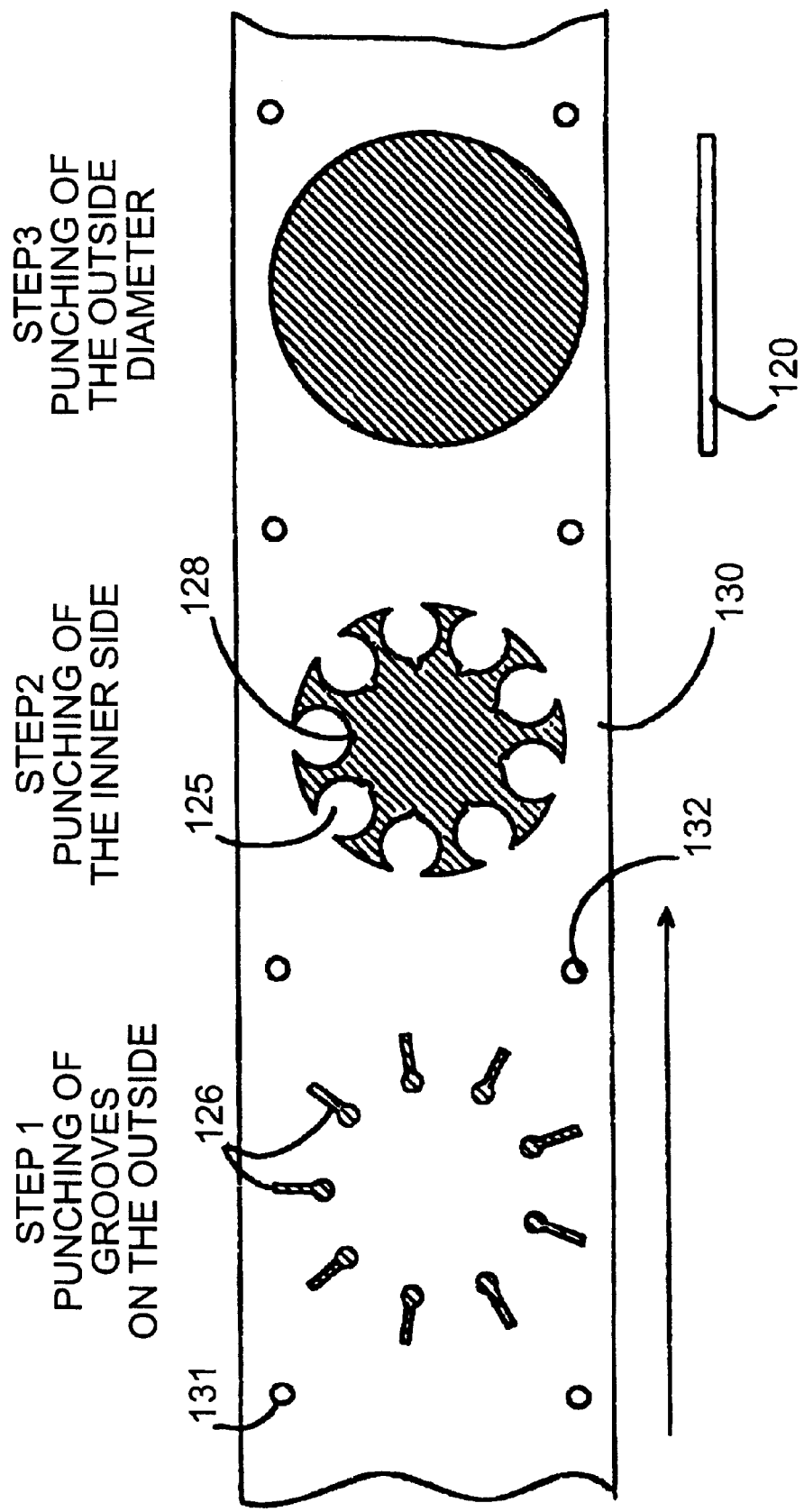
FIG. 5 is a layout diagram showing a method for producing a separation prevention ring according to the second embodiment and applied to the tube coupling shown in FIG. 1.
Figure 6:
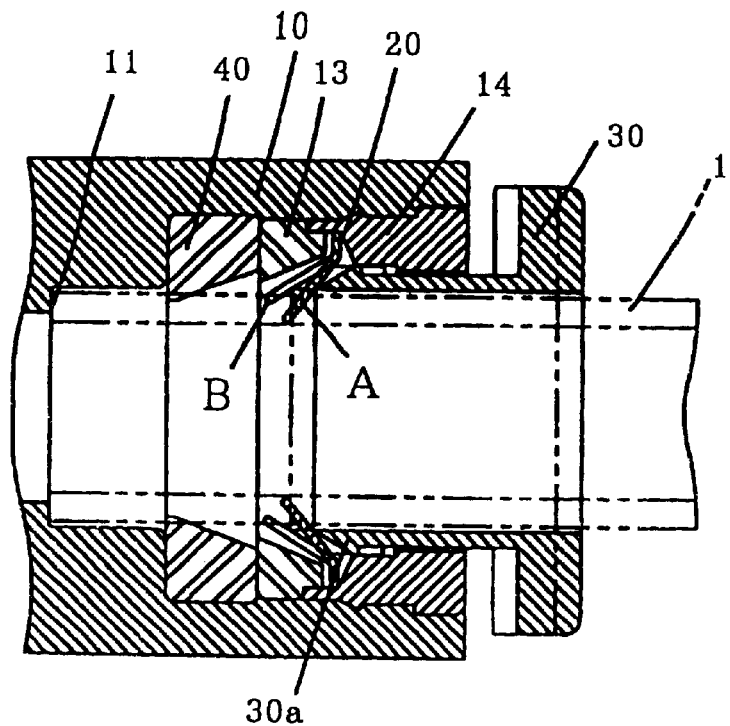
FIG. 6 is a cross-sectional view showing a conventional tube coupling.
Figure 7:
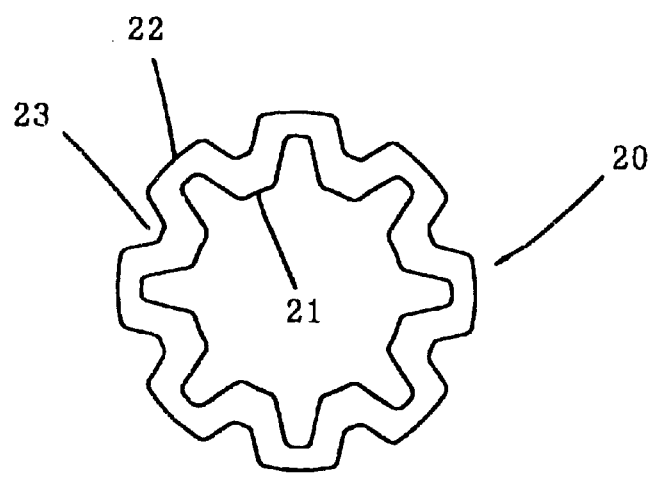
FIG. 7 is a plane view showing a separation prevention ring applied to the tube coupling shown in FIG. 6.

FIG. 5 is a layout diagram showing a fabricating step in a method for producing a separation prevention ring according to the second embodiment applied to the tube coupling of FIG. 1.

In this embodiment, the separation prevention ring 120 is stamped. The separation prevention ring 120 is stamped by a progressive punch die enabling three steps to be done.

As shown in FIG. 5, the grooves 126 are first formed by stamping an arbitrary metal plate 130 (step 1). The pushing portions 125 and the projections 128 are then punched on the inside diameter side (step 2), and the outside diameter side is lastly punched (step 3).

In FIG. 5, 131 denotes pilot holes and 132 denotes intermittent feeding pilot holes.

The separation prevention ring 120 obtained by this embodiment can provide the same operative effect as the separation prevention ring 120 of the first embodiment.

In this embodiment, the separation prevention ring 120 is formed by separately punching the inside diameter side (the pushing portions 125 and the projections 128) and the outside diameter side (the external line of the ring portion 121 and the grooves 126). But, the inside diameter side (the pushing portions 125 and the projections 128) and the outside diameter side (the external line of the ring portion 121 and the grooves 126) can also be punched simultaneously.

In view of the complexity of shape, the punch and the die structure for punching the inside diameter side and the punch and the die structure for punching the outside diameter side can be configured as the same process or separate processes as desired.

This embodiment can also have two projections 128 as shown in FIG. 4.

Although the present invention has been described on the basis of one embodiment as shown in the drawings, it is to be understood that the embodiment is a mere example and those skilled in the art can make various modifications and other equivalent embodiments.

What is claimed is:

1. A tube coupling comprising:
   a coupling body;
   a separation prevention ring which is disposed in said coupling body to bite into the outer wall of a tube body fitted into the coupling body so to prevent said tube body from coming out; and
   a release ring which is disposed in said coupling body so to be movable in an axial direction within a predetermined range and releases the biting into said tube body by the separation prevention ring by pushing said separation prevention ring, wherein:
   said separation prevention ring comprises a ring portion in contact with a back ring disposed in said coupling body;
   pushing portions, which are radially formed in large number within said ring portion, have a circular shape and have grooves which extend from the outside of the ring portion to the inside, and are pushed by an inside end of said release ring; and
   projections respectively formed at tips of said pushing portions and pulled out of the outer wall of said tube body when they are pushed by the inside end of said release ring in a state fitted in the outer wall of the tube body.

* * * * *